No. 890,729. PATENTED JUNE 16, 1908.
O. F. TRANSUE.
BEARING FOR CAR TRUCKS.
APPLICATION FILED JAN. 3, 1905.

Jos. J. Hosler.
Minnie F. Anthony, WITNESSES.

Oliver F. Transue, INVENTOR,
BY Harry Frease, ATTORNEY.

UNITED STATES PATENT OFFICE.

OLIVER F. TRANSUE, OF ALLIANCE, OHIO.

BEARING FOR CAR-TRUCKS.

No. 890,729.　　　　Specification of Letters Patent.　　　Patented June 16, 1908.

Application filed January 3, 1905. Serial No. 239,506.

*To all whom it may concern:*

Be it known that I, OLIVER F. TRANSUE, a citizen of the United States, residing at Alliance, in the county of Stark and State of Ohio, have invented a new and useful Improvement in Bearings for Car-Trucks, of which the following is a specification.

The invention relates to an antifriction bearing for a car on its truck so that there will be little or no resistance to the slight rotation of the truck rendered necessary for rounding curves and taking sidings; and the object of the improvement is to provide a simple, strong and efficient bearing which will not have its surfaces cut or ground by its operation. This object is attained by the construction and arrangement illustrated with reference to a center bearing in the accompanying drawing, in which—

Figure 1:
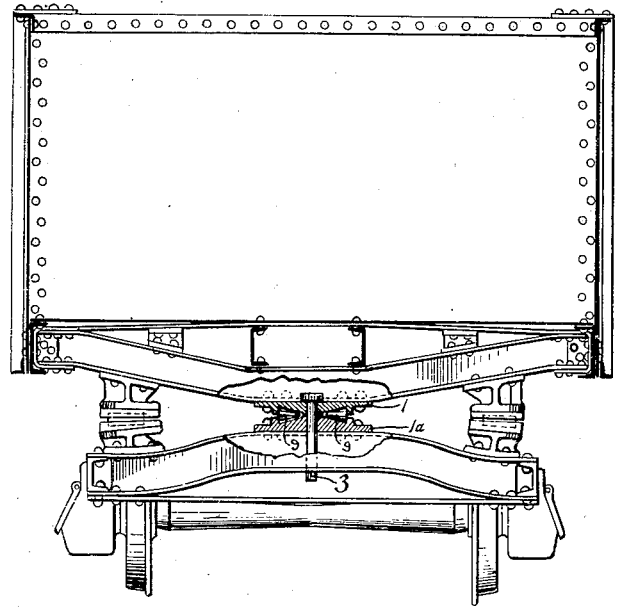
Figure 2:
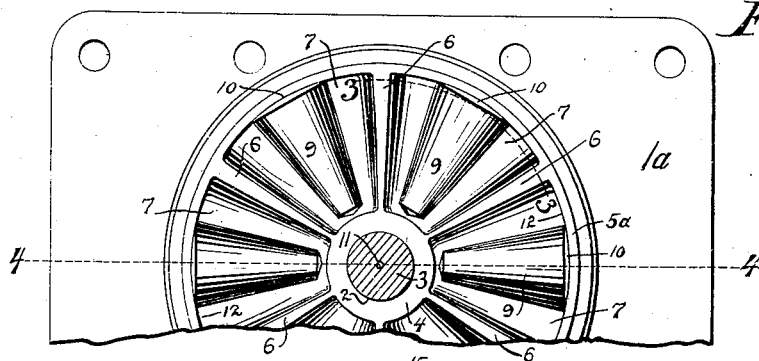
Figure 3:
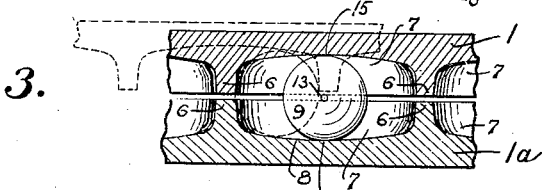
Figure 4:
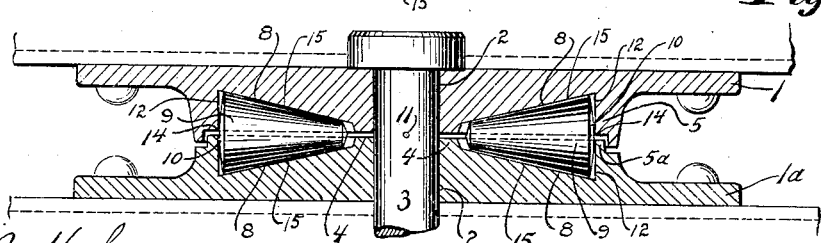

Figure 1, is a cross-section of a car showing the truck in elevation with the bolsters broken away to show the center bearing in section; Fig. 2, a plan view of part of the lower center plate showing the rollers therein; Fig. 3, a fragmentary section of the plates, as on line 3—3, Fig. 2, and showing the end of one roller; and Fig. 4, a section of the plates and rollers, as on line 4—4, Fig. 2.

Similar numerals refer to similar parts throughout the drawing.

The upper and lower plates 1 and 1ª are made substantially alike, with the axial apertures 2 for the center-pin 3, the interior annular flanges 4 around the apertures, the exterior annular flanges 5 and 5ª at some distance from the interior flanges, and the radial faced partitions 6 extending between the annular flanges. The recesses 7 formed between the several flanges have their bottoms inclined endwise downward and outward in the lower plate and upward and outward in the upper plate, so as to form full bearings 8 on the sides of the truncated-cone-shaped rollers 9, one of which rollers is radially located in each pair of opposing recesses.

The outer ends 10 of the rollers are preferably rounded, as the surface of the segment of a sphere having the intersection 11 of the axes of the center-pin and the rollers as a center, and the inner faces 12 of the exterior flanges are preferably formed vertical, or as near vertical as is convenient for casting or forging, so that they will be substantially cylindrical, and the contact of the outer end of each roll is theoretically limited to the horizontal line traversing the center 13 thereof, or practically to the lines of the abutting parts of the inner edges 14 of the exterior flanges, as indicated by dotted lines on the end of the roller in Fig. 3. Although this contact is very slight in the vertical direction it is extended to the full width of the rollers horizontally, and therefore tends to hold the roller in its proper radial position.

It will be noted that the frictional resistance arising from the outer end contact of the rollers, tending to retard their rotation, does not act horizontally to retard the lateral travel of these ends of the roller, but, excepting only at the points opposite the center 13 of the ends of the rollers, this resistance acts vertically, or substantially so, and in reverse directions, on the opposite sides of the centers. Furthermore such tendency as there may be to retard the lateral travel of the outer ends of the rollers arising from the friction of the contact of the ends of the rollers with the edges of the flange of one plate, is neutralized by the friction of the flange of the other plate, because the plates rotate in opposite directions when the bearing is brought into play. But it will be understood that the friction of the ends of the rollers against the exterior flanges is never very great because its amount depends on the centrifugal endwise thrust of the rollers, which thrust in turn cannot be made without an endwise sliding of the rollers on the respective plates. The bearings proper 8 of the plates on the rollers are along the upper and lower faces 15 of the rollers and throughout the entire length thereof, and while theoretically this bearing contact is merely along a line, yet practically it is on a face of some little width, so that the considerable bearing surface thus presented to the plates prevents, to a great extent, the rollers from sliding endwise.

The parts are so proportioned and arranged that the projection of the cones of which the rollers are truncated parts would bring their apexes to the intersection 11 of the axes of the center-pin and the rollers, so that there is no sliding or rubbing at any point in the bearing proper of the rollers on the plates, and consequently there is no cutting or grinding of the bearing surfaces. Such cutting or grinding as there may be from the contact of the ends of the rollers with the edges of the exterior flanges does not affect the bearing faces proper, and as has been explained this action is never very great in degree.

The normal location of the rollers is in the middle line of the several bearing recesses 7 when the truck is alined with the car, and the annular width of the recesses is so proportioned that the radial partition of one plate and the opposite partition of the other plate will abut against the sides of the rollers when the truck is rotated to the maximum extent necessary for the sharpest curve or turnout, as shown by broken lines in Fig. 3, and it is evident that when the truck is thus rotated, the radial faces of the partitions will act to rectify the relative location and the radial alinement of any of the rollers that may be diverted or deflected therefrom. In the same way the rollers are readily brought to their normal position when the parts of the truck are first assembled, and preferably before any considerable load is imposed on the bearing.

The bottoms of the bearing recesses may be formed deeper in the middle, reference being had to the annular section, with the effect that as the truck is rotated the car is slightly raised by the travel of the rollers on the bottoms of the recesses thus inclined toward the radial partitions, as shown by broken lines in Fig. 3, but it is not intended to limit the scope of the invention to this particular manner of making the bottoms of the recesses. Nor is it necessary that both plates shall be recessed, for it is evident that if either one or the other plate is provided with the flanges and partitions, the operation of the bearing will be substantially as described when both plates are recessed. And while the invention has been illustrated and described with reference to a center-bearing, it is evident that similar devices can be employed in a side bearing.

What I claim as my invention, and desire to secure by Letters Patent, is—

1. A car-truck center-bearing comprising a center-pin, upper and lower plates axially mounted thereon, there being opposite recesses in the plates having partitions with radial faces between and substantially cylindrical annular flanges around the same, and truncated-cone-shaped rollers radially located in opposing recesses and having their outer ends rounded and adapted to bear full width on the edges only of the flanges, the bottoms of the recesses being inclined endwise to bear on the sides of the rollers throughout their length and the radial faces of the partitions being arranged to abut the sides of the rollers and to rectify the alinement of the same when the truck is rotated to the maximum degree.

2. A car-truck bearing comprising upper and lower plates with opposite recesses therein having partitions with radial faces between and substantially cylindrical annular flanges around the same, and truncated-cone-shaped rollers radially located in opposing recesses and having their outer ends rounded and adapted to bear full width on the edges only of the flanges, the bottoms of the recesses being inclined endwise to bear on the sides of the rollers throughout their length and the radial faces of the partitions being arranged to abut the sides of the rollers and to rectify the alinement of the same when the truck is rotated to the maximum degree.

3. A car-truck bearing comprising upper and lower plates with opposite recesses therein having partitions with radial faces between the same, and truncated-cone-shaped rollers radially located in opposing recesses, the bottoms of the recesses being inclined endwise to bear on the sides of the rollers throughout their length and the radial faces of the partitions being arranged to abut the sides of the rollers and to rectify the alinement of the same when the truck is rotated to the maximum degree.

4. A car-truck bearing comprising upper and lower plates with opposite recesses therein having substantially cylindrical annular flanges around the same, and truncated-cone-shaped rollers radially located in opposing recesses and having their outer ends rounded and adapted to bear full width on the edges only of the flanges, the bottoms of the recesses being inclined endwise to bear on the sides of the rollers throughout their length.

In testimony whereof I have signed my name to this specification in the presence of two subscribing witnesses.

OLIVER F. TRANSUE.

Witnesses:
H. O. CAIN,
HARRY FREASE.